W. M. MUCHOW.
DENTAL FLOSS CONTAINER.
APPLICATION FILED MAR. 24, 1917.

1,260,011.

Patented Mar. 19, 1918.

WITNESSES:
Al Stark.
A. S. Peterson.

INVENTOR:
WILLIAM MARK MUCHOW,
BY
ATTORNEYS.

UNITED STATES PATENT OFFICE.

WILLIAM MARK MUCHOW, OF EVANSTON, ILLINOIS.

DENTAL-FLOSS CONTAINER.

1,260,011.  Specification of Letters Patent.  Patented Mar. 19, 1918.

Application filed March 24, 1917. Serial No. 157,099.

*To all whom it may concern:*

Be it known that I, WILLIAM MARK MUCHOW, a citizen of the United States, and a resident of the city of Evanston, in the county of Cook and State of Illinois, have invented a certain new and useful Improvement in Dental-Floss Containers; and I do hereby declare that the following description of my said invention, taken in connection with the accompanying sheet of drawing, forms a full, clear, and exact specification, which will enable others skilled in the art to which it appertains to make and use the same.

My invention relates generally to improvements in dental floss holders; and it consists, essentially, in the novel and peculiar combination of parts and details of construction, as hereinafter first fully set forth and described and then pointed out in the claims.

The object of my present invention is the production of an efficient, serviceable, and highly sanitary instrument for cleaning the teeth of humans, in which instrument there is removably located a container for the dental floss, which container, when the supply of floss is exhausted, is to be removed from the instrument, and a new one inserted therein, there being in said container in addition to the floss an antiseptic powder, paste, or dentifrice, which is automatically applied to the floss and adds greatly to the sanitary condition and effect of the instrument when in use.

Figure 1:
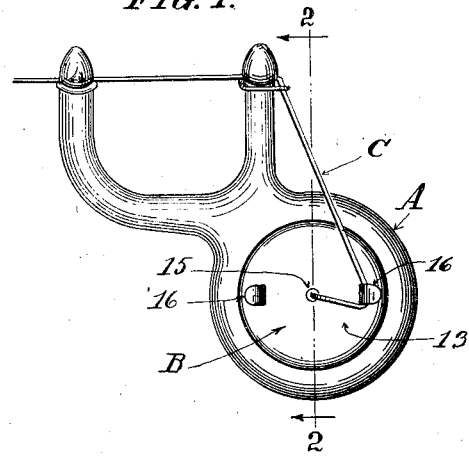
Figure 2:
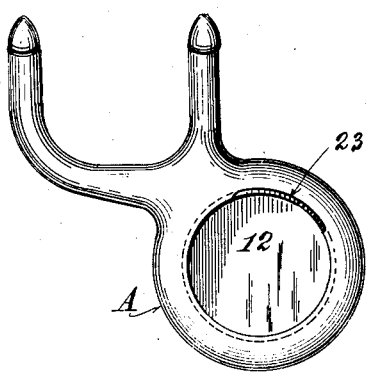
Figure 3:
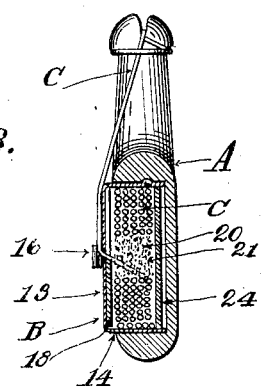
Figure 4:
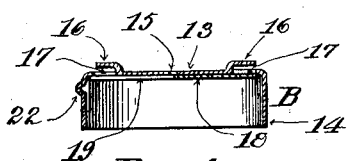
Figure 5:
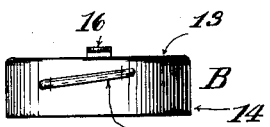
Figure 6:
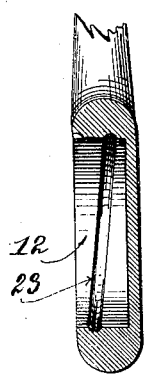
Figure 8:
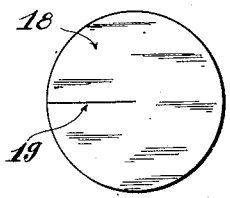
Figure 7:
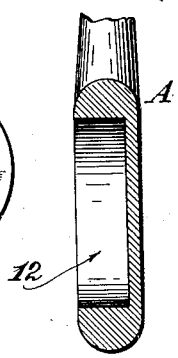

To accomplish these desirable results, I construct this instrument and the container, as shown in the drawings, forming part of this specification, in which Figure 1 is an elevation of the instrument drawn on a slightly increased scale, the instrument being in condition for use. Fig. 2 is a like view, the container for, and the floss therein, being removed. Fig. 3 is a sectional view of the instrument drawn on line 2—2 of Fig. 1. Fig. 4 is a sectional view of a portion of the container, and Fig. 5 is an elevation of the same. Fig. 6 is a sectional elevation of a portion of the instrument, also drawn on line 2—2 of Fig. 2. Fig. 7 is a like view showing a plain cavity in the instrument, and Fig. 8 is a plan of a disk used in connection with the container.

Like parts are designated by the same characters and symbols of reference in all the figures.

A, in the drawings designates the instrument as a whole, ready for use. The body of this instrument may be of any desired design or construction, preferably the one shown in an allowed application for patent filed by me on the 29th day of March, 1916, Serial No. 87,521, and patented on the 20th day of March, 1917, so long as there is in said body, or connected therewith, an opening or cavity 12, to receive the floss container B, for the dental floss or other thread C.

The floss container is, preferably, a circular, cup-shaped body having a bottom 13, and a rim 14, the latter being of a depth slightly greater than the depth of the cavity 12, so that the bottom portion of the container projects slightly beyond the face of the instrument. There is in this bottom 13 a centrally located, minute, opening 15, through which the floss C is passed, and at, preferably diametrically opposed points, there are projecting from the face of said bottom, L-shaped lugs 16, struck up from the bottom, in the well known manner, the metal struck up to form these lugs leaving in said bottom openings 17, which for my present purposes must be closed, and this I accomplish by placing into the container adjacent to the inner surface of the bottom a disk 18, shown detached in Fig. 8, said disk being preferably non-metallic, there being in said disk a slit 19, reaching from the peripheral margin to the center of the disk, through which slit the floss C is passed, the disk being applied to the floss before the latter is placed into the container.

The dental floss C is coiled or wound in such a manner that it unwinds from the center toward the outer periphery of the coil, thereby leaving the coil intact until the floss is entirely withdrawn; but in the coil there is left a central space 20, and into this space I place an antiseptic or medicated substance 21, in powdered or pasty form, through which the dental floss passes as it unwinds, and thereby pick up the medicated matter.

The external diameter of the container is slightly less than the diameter of the cavity 12 in the body of the instrument, to facilitate locating it into, and removing it from, the said cavity; but in order to cause the container to remain in the cavity, I form in the rim 14 a small projection 22, which impinges on the wall of the cavity sufficiently to frictionally hold the container in position. This projection may be only a teat, or it may be an inclined projection, as shown in Fig. 5, and if desired, there may be formed in the wall of the cavity 12 an inclined groove 23, Figs. 2 and 6, whereby the container may be screwed into and out of said cavity, the two lugs 16 forming convenient means for rotating the container.

Into the container, after the floss and the powder have been placed therein, there is pressed a, preferably paste-board, head 24, which head seals the container, and it may have on its exposed surface advertising or other matter. This container constitutes an article of manufacture and commerce independently of the instrument, and in the condition described, it can be transported and sold without danger of injury to, or the spilling of the contents thereof. It can be manufactured and sold at such a reasonable price as to preclude the idea of refilling and reusing the shell of the container.

I have hereinbefore described the preferred embodiment of my invention, but I desire it to be understood that details of construction may be varied, and parts omitted without departing from the scope of this invention as determined by the subjoined claims.

Having thus fully described this invention, I claim as new, and desire to secure to myself by Letters Patent of the United States—

1. A container for dental floss, said container being a cup-shaped shell, there being in the bottom of said shell an opening, sharp-edged lugs projecting externally from said bottom, a closure for said shell, a disk in said shell adjacent the bottom thereof, said disk having a slit extending from the margin of said disk toward the center thereof, and a coil of dental floss in said shell, a strand of said floss being passed through said slit and through the opening in the bottom.

2. A container for dental floss, said container being a cup-shaped shell, there being in the bottom of said shell an opening, a closure for said shell, a disk in said shell adjacent the bottom thereof, said disk having a slit extending from the margin thereof toward the center, a coil of dental floss in said shell, a strand of said floss being passed through said slit and said opening in the bottom, said floss unwinding from the center of the coil, there being in said coil a space adapted to receive a dentifrice, whereby said strand when being unwound is impregnated with said dentifrice.

3. A package of dental floss, comprising a container, a coil of dental floss, and a dentifrice in said container, said coil having centrally an annular space, said dentifrice being located in said space.

In testimony that I claim the foregoing as my invention, I have hereunto set my hand.

WILLIAM MARK MUCHOW.